(12) United States Patent
Ashish et al.

(10) Patent No.: US 7,912,470 B2
(45) Date of Patent: Mar. 22, 2011

(54) METHOD OF PARTITIONING RESOURCES IN A COGNITIVE RADIO WIRELESS COMMUNICATION SYSTEM AND SYSTEM SUPPORTING THE SAME

(75) Inventors: Pandharipande Ashish, Yongin-si (KR); Duck-Dong Hwang, Yongin-si (KR); Jae-Myeong Kim, Seoul (KR); Sang-Jo Yoo, Incheon (KR); Kyoung-Jin Cho, Incheon (KR); Jae-Hak Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 218 days.

(21) Appl. No.: 11/593,296

(22) Filed: Nov. 6, 2006

(65) Prior Publication Data

US 2007/0115878 A1 May 24, 2007

(30) Foreign Application Priority Data

Nov. 5, 2005 (KR) .................. 10-2005-0105761

(51) Int. Cl.
*H04W 40/00* (2009.01)
*H04B 7/212* (2006.01)
*H04B 7/00* (2006.01)
*H04W 4/00* (2009.01)

(52) U.S. Cl. ........ 455/448; 370/330; 370/338; 370/347; 370/329; 455/446; 455/502

(58) Field of Classification Search .......... 455/425, 455/418, 450, 457, 561, 524; 370/336, 330, 370/370, 337, 347, 329, 338, 352
See application file for complete search history.

(56) References Cited

U.S. PATENT DOCUMENTS

| 5,774,814 | A * | 6/1998 | Haas ........................... 455/524 |
| 2003/0210680 | A1 * | 11/2003 | Rao et al. .................... 370/352 |
| 2007/0117537 | A1 * | 5/2007 | Hui et al. ..................... 455/405 |

FOREIGN PATENT DOCUMENTS

CN 1457156 11/2003

OTHER PUBLICATIONS

Mitola III, Joseph, "Cognitive Radio for Flexible Mobile Multimedia Communications", Mobile Networks and Applications 6, 435-441, 2001.*
Mitola III, Cognitive Radio for Flexible Mobile Multimedia Communications. Mobile Networks and Applications 6,435-441, 2001.*
Mitola II, Joseph, Cognitive Radio for Flexible Mobile Multimedia Communications; Mobile Networks and Applications 6,435,-441, 2001; Kluwer Academic Publishers.*
Ye Pei-jun et al. "*Application of Cognitive Radio for Future Mobile Multimedia Communications*," Feb. 29, 2004, China Academic Journal Electronic Publishing House, Telecommunication Engineering, pp. 25-29.

* cited by examiner

*Primary Examiner* — Nick Corsaro
*Assistant Examiner* — Manpreet S Matharu

(57) ABSTRACT

A method of partitioning resources in a CR wireless communication system and a system supporting the same are provided. A new BS receives radio resource status information from a prior BS using a particular frequency band, and requests resource partitioning to the prior BS using a new uplink subchannel defined for communications between BSs. Resource negotiation messages are exchanged over a channel defined between the two BSs so as to efficiently partition resources between the BSs.

11 Claims, 3 Drawing Sheets

METHOD OF PARTITIONING RESOURCES IN A COGNITIVE RADIO WIRELESS COMMUNICATION SYSTEM AND SYSTEM SUPPORTING THE SAME

PRIORITY

This application claims priority under 35 U.S.C. §119 to an application entitled "Method of Partitioning Resources in a Cognitive Radio Wireless Communication System and System Supporting the Same" filed in the Korean Intellectual Property Office on Nov. 5, 2005 and assigned Serial No. 2005-105761, the contents of which are incorporated herein by reference.

BACKGROUND OF THE INVENTION

1. Field of the Invention

The present invention relates generally to a method of partitioning resources in a Cognitive Radio (CR) wireless communication system and a system supporting the same, and, in particular, to a method of partitioning resources for Base Stations (BSs) and a system supporting the same.

2. Description of the Related Art

The rapid development of wireless communication systems and the emergence of diverse services are a driving force behind the ever-increasing demands for radio resources. However, radio resources, i.e. frequency spectrum, is considered a public asset and thus is subject to strict government regulations. Because most available frequency bands are occupied, there is a great difficulty in frequency band allocation for new wireless communication systems.

As a solution to this problem, CR technology has been proposed. CR senses an already allocated but unused frequency band and shares the frequency band efficiently.

CR is based on point-to-multipoint communications. In a CR wireless communication system, a BS (hereinafter, CR BS) operates radio resources to enable as many Mobile Stations (MSs) as possible to efficiently communicate.

It is reported that wireless communication systems have very low frequency utilization. In this context, CR has been introduced to increase frequency utilization and facilitate deployment of a new wireless communication system. CR was standardized as Institute of Electrical and Electronics Engineers (IEEE) 802.22 Wireless Regional Area Network (WRAN). The IEEE 802.22 WRAN is an application of CR to TV frequency bands, seeking to increase frequency utilization and expand wireless Internet service by sharing unused TV frequency bands for wireless data communications.

CR, which is a technology for managing and partitioning multiple radio channels and detecting interference, is likely to interwork with future-generation wireless communication technologies. For example, CR will likely be effective in providing high-speed data transmission without frequency interference in a shadowing area encountered under a cellular environment or a suburban area requiring an increased cell size.

However, there are many considerations in real application of CR to wireless communication systems. A major consideration is efficient resource allocation. Resource allocation in the CR technology can be considered in the following two ways. One way to address resource allocation is to efficiently use unused radio resources for a CR system among radio resources licensed to legacy wireless communication system. The other way is to partition resources to CR BSs when a plurality of CR BSs are neighboring to each other.

FIG. 1 illustrates a situation requiring resource partitioning to a plurality of CR BSs in a CR system. In the illustrated case of FIG. 1, a new CR BS (a second CR BS) 112 using the same frequency band is added in a radio environment where a first CR BS 111 is servicing. Normal service to an MS is impossible in an overlapped area between service areas of the first CR BS 111 and the second CR BS 112 due to collision between the two CR BSs.

If each of the first and second CR BSs 111 and 112 is aware of the other CR BS based on the CR technology, another channel will be detected and the collision can be avoided. Yet, if all channels are in use, inter-BS interference is unavoidable. Accordingly, there exists a pressing need for partitioning limited radio resources to CR BSs in a radio environment where a plurality of CR BSs are positioned neighboring to each other.

SUMMARY OF THE INVENTION

An object of the present invention is to substantially solve at least the above problems and/or disadvantages and to provide at least the advantages below. Accordingly, the present invention provides a method of efficiently partitioning radio resources among CR BSs and a wireless communication system using the same.

The present invention provides a method of partitioning radio resources among a plurality of CR BSs by negotiations and a wireless communication system using the same.

The present invention further provides a method of negotiating frequency bands for resource partitioning among a plurality of CR BSs.

The present invention provides a method of allocating resources to a new CR BS installed in the service area of an existing CR service and a wireless communication system using the same.

The present invention also provides a method of enabling only a plurality of CR BSs to compete for resource partitioning and a wireless communication system using the same.

The present invention further provides a new ranging channel for use in frequency band negotiations for resource partitioning among a plurality of CR BSs.

The present invention still further provides a method of monitoring the existence of an unused channel and requesting radio resource partitioning in the absence of any available channel in a new CR BS installed in the channel area of an existing CR BS and a wireless communication system using the same.

The present invention provides a method of requesting radio resource partitioning to an existing CR BS in the absence of any available frequency band in a new CR BS installed in the communication area of the existing CR BS and a wireless communication system using the same.

The present invention also provides a resource partitioning method for increasing the efficiency of a BS band request by adding a part for competition among CR BSs only and a new subchannel for comprehensive CR management in a ranging subchannel being an uplink access channel for an existing CR BS, and provides a wireless communication system using the same.

According to one aspect of the present invention, in a method of partitioning resources in a CR wireless communication system, a new BS requests resource partitioning to a prior BS using uplink resources allocated from the prior BS and receives receiving information about partitioned resources in response to the request from the prior BS. The prior BS services a predetermined area using uplink and downlink resources and the new BS is a BS newly installed in the service area of the prior BS.

According to another aspect of the present invention, in a method of partitioning resources in a CR wireless communication system, a prior BS receives a resource partitioning request from a new BS, partitions radio resources of the prior BS to the new BS, and sends information about the partitioned radio resources to the new BS. Here, the new BS is a BS newly installed in the service area of the prior BS.

According to a further aspect of the present invention, in a method of partitioning resources in a CR wireless communication system, a new BS requests resource partitioning to a prior BS using uplink resources allocated from the prior BS. The prior BS partitions radio resources of the prior BS to the new BS and sends information about the partitioned radio resources to the new BS. The new BS receives the information about the partitioned radio resources. Here, the prior BS services a predetermined area using uplink and downlink resources and the new BS is a BS newly installed in the service area of the prior BS.

According to still another aspect of the present invention, in a CR wireless communication system for partitioning resources, at least one new BS requests resource partitioning and receiving information about partitioned radio resources in response to the resource partitioning request, and a prior BS partitions a portion of radio resources of the prior BS to the new BS and sends the information about the partitioned radio resources to the new BS. Here, the prior BS services a predetermined area using uplink and downlink resources and the new BS is a BS newly installed in the service area of the prior BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Before describing the present invention, terms used herein are defined as follows.

Prior CR BS: a CR BS servicing MSs within its service area with already secured radio resources.

New CR BS: a new CR BS requiring radio resources, installed in the service area of the prior CR BS.

Radio resource status information: generic information required to request resource partitioning, sent by the prior CR BS.

System Information (Info): downlink control information required for CR implementation.

System Info field: a field carrying the system information on the downlink.

Contention-based ranging subchannel (BS_Communication_Subchannel): an uplink subchannel periodically or non-periodically allocated by the prior CR BS, for contention-based ranging of the new CR BS.

Subchannel identification flag (BS_Communication_Flag): information indicating whether the contention-based ranging subchannel has been allocated, i.e. an indicator indicating the presence or absence of information about the BS_Communication_Subchannel.

Subchannel identification flag field: a field carrying the subchannel identification flag among fields carrying the system information on the downlink.

Resource Partition Request (RPREQ) message: a message sent from the new CR BS to the prior CR BS to request resource partitioning.

Resource Partition Response (RPREP) message: a response for the RPREQ message sent from the prior CR BS to the new CR BS.

The following description is made of a method of requesting resource partitioning to the prior CR BS and using the partitioned resources in the new CR BS, in the absence of an unused frequency band allocated to the prior CR BS (i.e. an available frequency band). While the description is made in the context of a CR-OFDMA system, it will be understood by those of skill in the art that the present invention is applicable to any CR system based on Code Division Multiple Access (CDMA), Time Division Multiple Access (TDMA), or Frequency Division Multiple Access (FDMA). In these multiple access schemes, resources are allocated by subchannels in OFDMA, by channel codes in CDMA, by time slots in TDMA, and by frequency bands in FDMA.

For implementation of the present invention, a negotiation procedure for resource partitioning is required between the prior CR BS and the new CR BS. Also, a novel frame format is needed to support the resource partitioning negotiations. In addition, an operation for receiving resources through the resource partitioning negotiations is specified herein.

Figure 1:
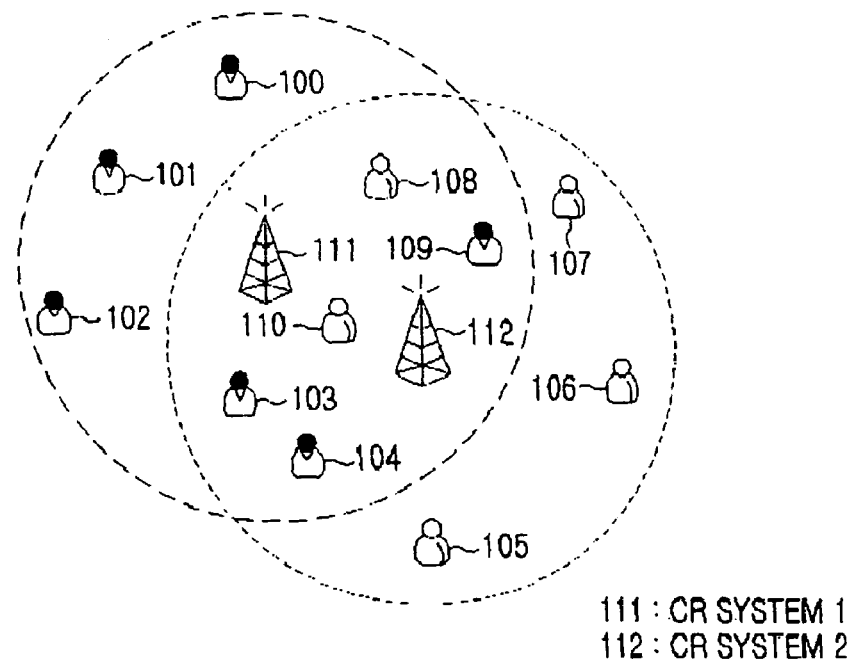
FIG. 1 illustrates a situation requiring resource partitioning among a plurality of CR BSs in a CR wireless communication system.
Figure 2:
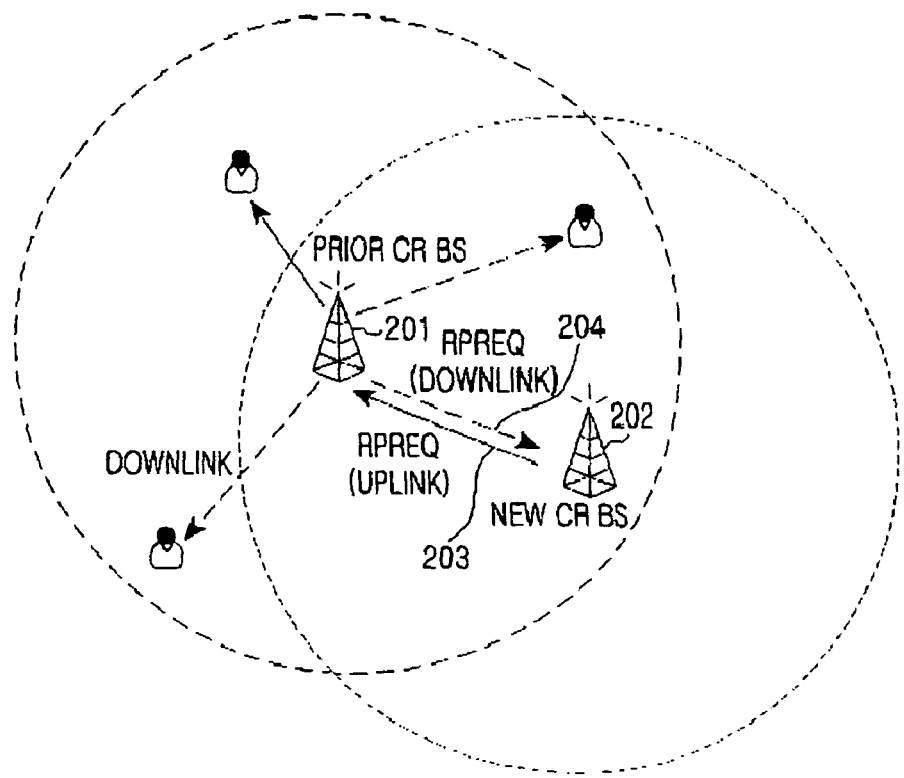
FIG. 2 illustrates a resource partitioning procedure according to the present invention.

FIG. 2 illustrates a resource partitioning procedure according to the present invention. Referring to FIG. 2, a new CR BS 202 has to compete for a CDMA code and an uplink 203 over a ranging subchannel of an OFDMA frame in order to use the uplink 203 of a prior CR BS 201. This is called contention-based ranging. Since the new CR BS 202 competes with MSs within the communication area of the prior CR BS 201 at the same level, it is rather unfair to the new CR BS 202 because the new CR BS 202 is treated with a relatively high priority. From the perspective of resource partitioning, a significant delay may be caused. Hence, the contention-based ranging is inefficient.

In accordance with the present invention, therefore, a separate period is defined to enable new CR BSs to request frequency bands, i.e. uplink resource allocation for requesting resource partitioning in a contention-based manner. That is, a method of contention-based ranging between new CR BSs only is provided.

The new CR BS 202 is allocated a subchannel for contention-based ranging with other new CR BSs from the prior CR BS 201. The subchannel is allocated by radio resource status information broadcast from the prior CR BS 201. The new CR BSs which has been allocated the subchannel compete for uplink resources on the subchannel, to send an RPREQ message. That is, the new CR BS 202 carries out contention-based ranging with other new CR BSs on the subchannel.

If acquiring uplink resources by contention-based ranging, the new CR BS 202 sends an RPREQ message to the prior CR BS 201 using the uplink resources, as indicated by reference numeral 203. The prior CR BS 201 replies with an RPREP message, as indicated by reference numeral 204. The RPREP message includes information about radio resources partitioned to the new CR BS 202.

Figure 3:
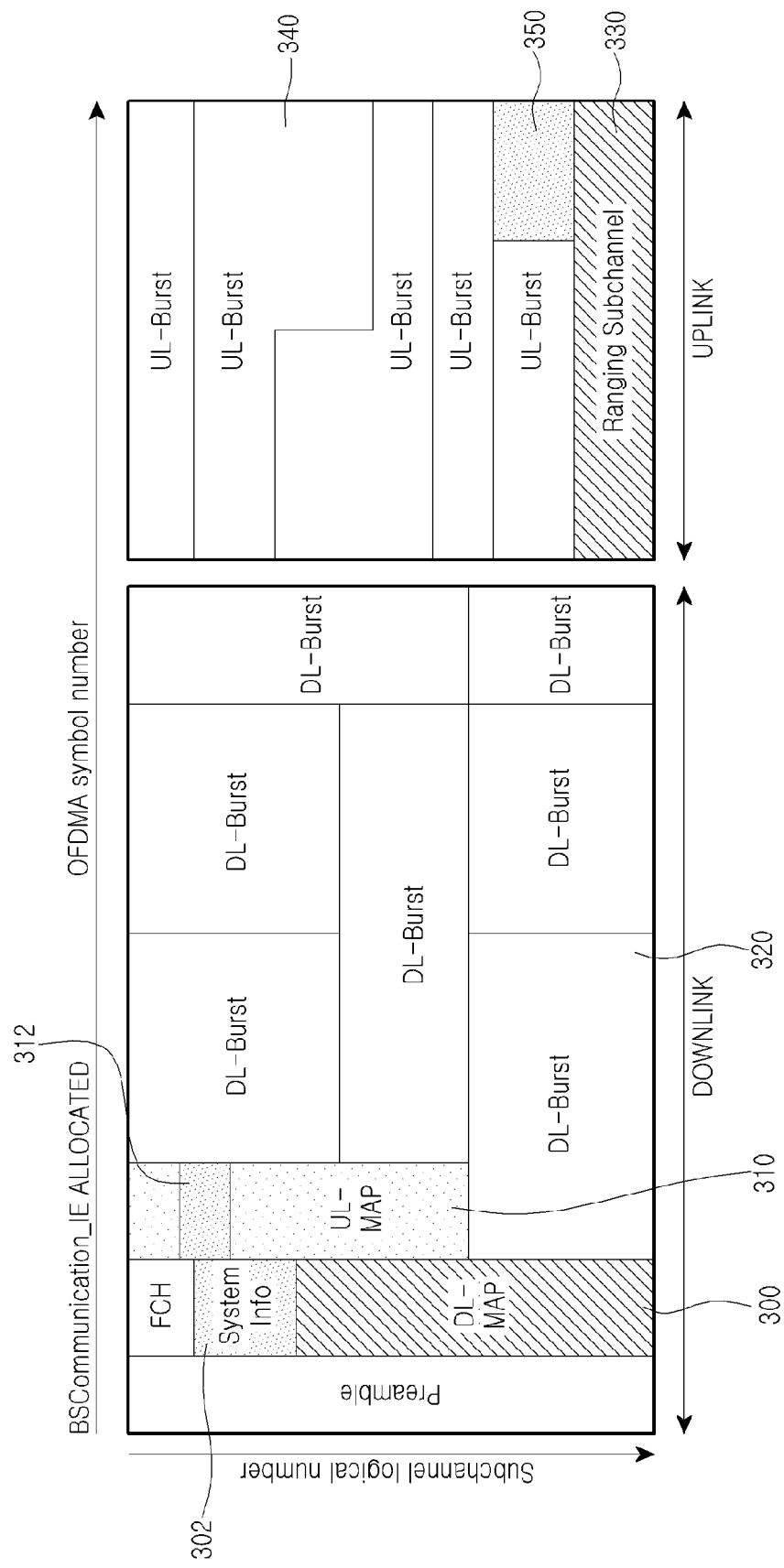
FIG. 3 illustrates the structure of a new Orthogonal Frequency Division Multiple Access (OFDMA) frame according to the present invention.

FIG. 3 illustrates the structure of a new OFDMA frame according to the present invention. Referring to FIG. 3, a Downlink MAP (DL-MAP) message 300 defines how downlink resources allocated in OFDMA symbol-subchannel blocks to a physical layer of a DL-burst mode 320 are used.

System Info 302 is newly added in the DL-MAP 300. The System Info 302 is a downlink control part for CR implementation, including a subchannel identification flag. The subchannel identification flag indicates the presence or absence of a subchannel on which to request ranging in a received OFDMA frame.

An Uplink MAP (UL-MAP) message 310 defines how UL-Bursts 340 are used by successive Information Elements (IEs) specifying the usage of each uplink period. That is, the UL-MAP message 310 specifies the usages of uplink resources allocated in OFDMA symbol-subchannel blocks. In the presence of the subchannel identification flag, a new part 312 carrying information about the contention-based ranging subchannel is defined in the UL-MAP message 310.

A ranging subchannel 330 is used for ranging of MSs within the service area of the prior CR BS. Ranging is a set of processes for maintaining the quality of Radio Frequency (RF) connections among BSs and MSs. Through ranging, an MS is connected to a network to acquire accurate transmission parameters such as time offset and power level, to thereby communicate with a BS.

A contention-based ranging subchannel 350 is periodically allocated for contention-based ranging between new CR BSs only. The contention-based ranging subchannel 350 is indicated by contention-based ranging subchannel information in radio resource status information (DL-MAP and UL-MAP) sent by the prior CR BS. The contention-based ranging subchannel information is periodically delivered in new part (IE) 312 containing contention-based ranging subchannel information. In the CR system, radio resource status information in a downlink frame (DL-MAP and UL-MAP) tells how uplink resources are allocated to MSs and other CR systems.

As noted from FIG. 3, the new OFDMA frame according to an embodiment of the present invention includes the System Info 302, the contention-based ranging subchannel information 312, and the contention-based ranging subchannel 350. These can be inserted in downlink/uplink control information.

Figure 4:
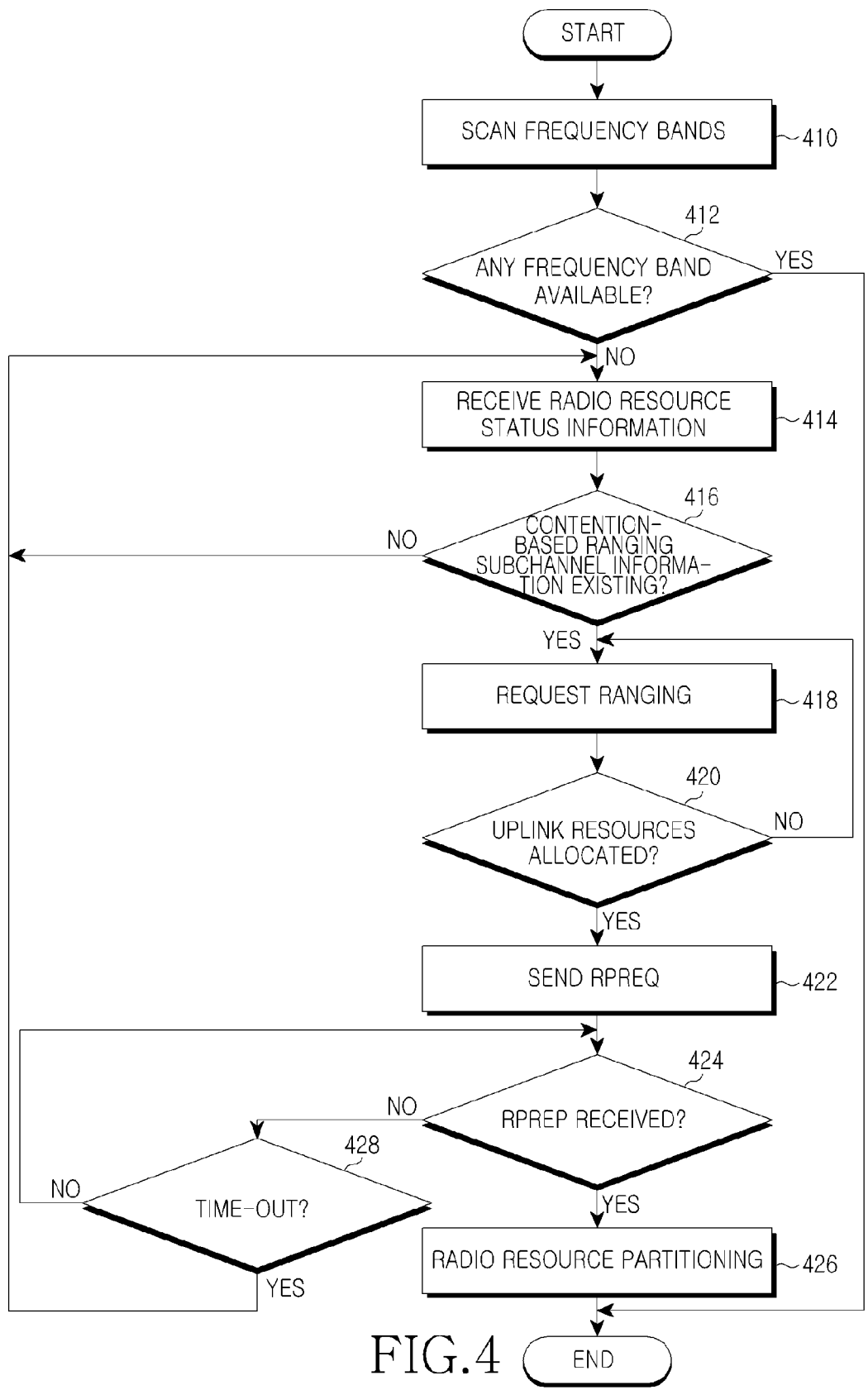
FIG. 4 is a flowchart illustrating a control operation in a new CR BS according to the present invention.

FIG. 4 is a flowchart illustrating a control operation in the new CR BS according to the present invention. The control operation is divided into a first procedure for allocating uplink resources by which to request resource partitioning (steps 410 to 420) and a second procedure for resource partitioning (steps 422 to 428). If the prior CR BS does not allow resource partitioning, the first procedure is repeated.

Referring to FIG. 4, after being installed and powered, the new CR BS scans total frequency bands to detect unused frequency bands by the prior CR BS and other systems, i.e. available frequency bands in step 410. In step 412, the new CR BS determines whether there is an available frequency band. In the presence of an available frequency band, the new CR BS ends the resource partitioning operation because it does not need to receive partitioned resources from the prior CR BS. On the contrary, in the absence of any available frequency band, the new CR BS has to request resource partitioning to the prior CR BS using uplink resources. For this purpose, the new CR BS has to be allocated the uplink resources from the prior CR BS.

The new CR BS receives radio resource status information in step 414. The radio resource status information is periodically or non-periodically broadcast in a UL-MAP by the prior CR BS. In step 416, the new CR BS monitors the presence of contention-based ranging subchannel information by checking a subchannel identification flag in System Info. The subchannel identification flag indicates the presence or absence of the contention-based ranging subchannel information in the UL-MAP.

In the absence of the contention-based ranging subchannel information, the new CR BS receives radio resource status information again in step 414. In the presence of the contention-based ranging subchannel information, the new CR BS requests ranging to the prior CR BS on a subchannel indicated by the contention-based ranging subchannel information in step 418. The subchannel is commonly used by new CR BSs within the service area of the prior CR BS. Therefore, the ranging request is made in a contention-based manner between new CR BSs that want to receive uplink resources. The contention is done by Carrier Sense Multiple Access/Collision Avoidance (CSMA/CA) or individual CDMA code information.

In step 420, the new CR BS monitors allocation of uplink resources from the prior CR BS in response to the ranging request. When the ranging request is accepted, the prior CR BS individually allocates the uplink resources to the new CR BS so that the new CR BS can send an RPREQ message. If the new CR BS fails to receive the uplink resources for a predetermined time, it requests ranging again in step 418. If the uplink resources are allocated, the new CR BS initiates the procedure of requesting resource partitioning.

In step 422, the new CR BS sends the RPREQ message to the prior CR BS using the uplink resources. The new CR BS then monitors reception of an RPREP message from the prior CR BS before until a predetermined time elapses in steps 424 and 428. Upon successful receipt of the RPREQ message, the prior CR BS sends the RPREP message including information about resources partitioned from its resources. The proportion of the partitioned resources is preset or negotiated in a predetermined method between the CR BSs.

Upon time-out, the new CR BS returns to step 414 to re-perform the uplink resource allocation procedure. Upon receipt of the RPREP message, the new CR BS completes radio resource partitioning successfully in step 426. Thus, the new CR BS is capable of providing service to MSs within its service area using the partitioned resources.

In accordance with the present invention as described above, collision between CR BSs is avoided by efficiently controlling interference between them and partitioning common radio resources between different two communication areas. Also, the introduction of a System Info control part and contention-based ranging of the subchannel facilitates management or control of the downlink and the uplink, and efficiently eliminates the constraint of competing with MSs from new CR BSs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of partitioning resources in a Cognitive Radio (CR) wireless communication system, the method comprising:

determining if at least two new Base Stations (BSs) are newly installed in a service area of a prior Base Station (BS);

allocating a contention-based ranging subchannel of the prior BS to the at least two BSs when the at least two BSs are in the absence of any available frequency band;

performing contention-based ranging between the at least two new BSs through the contention-based ranging subchannel;

allocating uplink resources of the prior BS to a new BS being one of the at least two new BSs as a result of the contention-based ranging;

requesting resource partitioning to the prior BS through the uplink resources by the new BS; and receiving information about partitioned resources in response to the requesting from the prior BS by the new BS, wherein the contention-based ranging subchannel is periodically allocated for contention between only the at least two new BSs.

2. The method of claim 1, wherein, if the prior BS and the new BS support Orthogonal Frequency Division Multiple Access (OFDMA), the radio resource status information includes at least a subchannel identification flag and contention-based ranging subchannel information, wherein the subchannel identification flag indicates a presence or absence of the contention-based ranging subchannel information and a contention-based ranging subchannel information indicates a contention-based ranging subchannel.

3. A method of partitioning resources in a Cognitive Radio (CR) wireless communication system, the method comprising:

determining if at least two new Base Stations (BSs) are newly installed in a service area of a prior Base Station (BS);

allocating, by the prior BS, a contention-based ranging subchannel of the at least two BSs when the at least two BSs are in the absence of any available frequency band;

allocating, by the prior BS, uplink resources to a new BS being one of the at least two new Base Stations (BSs) as a result of contention-based ranging between the at least two new BSs;

receiving, by the prior BS, a resource partitioning request from the new BS, the resource partitioning request being a request requested by the new BS through the uplink resources;

partitioning, by the prior BS, radio resources of the prior BS to the new BS; and transmitting, by the prior BS, information about the partitioned radio resources to the new BS, wherein the contention-based ranging subchannel is periodically allocated for contention between only the at least two new BSs.

4. The method of claim 3, further comprising:
transmitting radio resource status information to the new BS by the prior BS.

5. The method of claim 4, wherein if the prior BS and the new BS support Orthogonal Frequency Division Multiple Access (OFDMA), the radio resource status information includes at least a subchannel identification flag and contention-based ranging subchannel information, wherein the subchannel identification flag indicates a presence or absence of the contention-based ranging subchannel information and the contention-based ranging subchannel information indicates the contention-based ranging subchannel.

6. A method of partitioning resources in a Cognitive Radio (CR) wireless communication system, the method comprising:

determining if at least two new Base Stations (BSs) are newly installed in a service area of a prior Base Station (BS);

allocating a contention-based ranging subchannel of the prior BS to the at least two BSs when the at least two BSs are in the absence of any available frequency band BS by the prior BS;

performing contention-based ranging between the at least two new BSs through the contention-based ranging subchannel allocating uplink resources of the prior BS to a new BS being one of the at least two new BSs as a result of the contention-based ranging;

requesting resource partitioning to the prior BS through the uplink resources by the new BS;

partitioning radio resources of the prior BS to the new BS by the prior BS;

transmitting information about the partitioned radio resources to the new BS by the prior BS; and receiving the information about the partitioned radio resources by the new BS, wherein the contention-based ranging subchannel is periodically allocated for contention between only the at least two new BSs.

7. The method of claim 6, further comprising:
transmitting the radio resource status information to the new BS by the prior BS.

8. The method of claim 6, wherein if the prior BS and the new BS support Orthogonal Frequency Division Multiple Access (OFDMA), the radio resource status information includes at least a subchannel identification flag and contention-based ranging subchannel information, wherein the subchannel identification flag indicates a presence or absence of the contention-based ranging subchannel information and the contention-based ranging subchannel information indicates the contention-based ranging subchannel.

9. A Cognitive Radio (CR) wireless communication system for partitioning resources, comprising:

at least two new Base Stations (BSs) are newly installed in a service area of a prior Base Station (BS);

the new Base Station (BS) for performing contention-based ranging between the at least two BSs though a contention-based ranging subchannel, requesting resource partitioning by using uplink resources allocated through the contention-based ranging, and receiving information about partitioned radio resources in response to requesting resource partitioning; and a prior BS for allocating a contention-based ranging subchannel to the at least two new BSs when the at least two new BSs are in the absence of any available frequency band, allocating the uplink resources to the new BS being one of the at least two new BSs as a result of the contention-based ranging, partitioning radio resources of the prior BS to the new BS, and transmitting the information about the partitioned radio resources to the new BS, wherein the contention-based ranging subchannel is periodically allocated for contention between only the at least two new BSs.

10. The CR wireless communication system of claim 9, wherein the prior BS transmits radio resource status information for the contention-based ranging to the new BS.

11. The CR wireless communication system of claim 10, wherein if the prior BS and the new BS support Orthogonal Frequency Division Multiple Access (OFDMA), the radio resource status information includes at least a subchannel identification flag and contention-based ranging subchannel information, wherein the subchannel identification flag indicates a presence or absence of the contention-based ranging subchannel information and the contention-based ranging subchannel information indicates the contention-based ranging subchannel.

* * * * *